United States Patent
Free et al.

(10) Patent No.: US 10,480,377 B2
(45) Date of Patent: Nov. 19, 2019

(54) SYSTEM AND METHOD TO IMPROVE AFTERTREATMENT IN AN INTERNAL COMBUSTION ENGINE

(71) Applicant: Cummins Inc., Columbus, IN (US)

(72) Inventors: Paul Douglas Free, Hope, IN (US); Jennifer Kay Light-Holets, Greenwood, IN (US); Vaibhav Daramwar, Columbus, IN (US); David A. Brush, Columbus, IN (US)

(73) Assignee: Cummins Inc., Columbus, IN (US)

( * ) Notice: Subject to any disclaimer, the term of this patent is extended or adjusted under 35 U.S.C. 154(b) by 121 days.

(21) Appl. No.: 15/432,464

(22) Filed: Feb. 14, 2017

(65) Prior Publication Data
US 2017/0152781 A1  Jun. 1, 2017

Related U.S. Application Data

(63) Continuation of application No. PCT/US2015/046549, filed on Aug. 24, 2015.
(Continued)

(51) Int. Cl.
*F01N 3/22* (2006.01)
*F01N 9/00* (2006.01)
(Continued)

(52) U.S. Cl.
CPC ............... *F01N 3/225* (2013.01); *F01N 9/00* (2013.01); *F01N 13/011* (2014.06);
(Continued)

(58) Field of Classification Search
CPC . F01N 3/22; F01N 9/00; F01N 13/107; F01N 2430/02; F02D 41/0087; F02M 26/43
See application file for complete search history.

(56) References Cited

U.S. PATENT DOCUMENTS 6,082,100 A     7/2000  Boegner et al.
6,513,322 B2 *  2/2003  Ohuchi ............... F02D 41/024
                                              60/284
(Continued)

FOREIGN PATENT DOCUMENTS

WO    WO-2013044012 A1 *  3/2013  ............. F01N 13/148
WO    WO-2014122389 A1 *  8/2014  ............. F02B 37/183

OTHER PUBLICATIONS

International Search Report and Written Opinion, PCT/US2015/46549, dated Jan. 28, 2016, Cummins Inc., 13 pages.

*Primary Examiner* — Audrey K Bradley
(74) *Attorney, Agent, or Firm* — Taft Stettinius & Hollister LLP

(57) ABSTRACT

A system and method are disclosed for improving the performance of an aftertreatment system by elevating its temperature above an activation temperature. According to at least one aspect of the present disclosure, the method includes injecting a quantity of a fuel into certain fueled cylinders of a plurality of combustion cylinders of an internal combustion engine, the plurality of combustion cylinders further including non-fueled cylinders. Exhaust from the fueled cylinders is directed through the aftertreatment system while uncombusted gas from the non-fueled cylinders is directed away from the aftertreatment system. In certain embodiments, the uncombusted gas may be directed into an intake manifold in fluid communication with the plurality of combustion cylinders through an orifice. The system includes an engine having exhaust valves to control flow of the exhaust and uncombusted gas and a controller configured to perform the operations of the method.

11 Claims, 6 Drawing Sheets

Related U.S. Application Data

(60) Provisional application No. 62/040,633, filed on Aug. 22, 2014.

(51) Int. Cl.

| | | |
|---|---|---|
| *F01N 13/10* | (2010.01) | |
| *F01N 13/14* | (2010.01) | |
| *F02D 41/00* | (2006.01) | |
| *F02M 26/43* | (2016.01) | |
| *F01N 13/00* | (2010.01) | |
| *F02D 41/02* | (2006.01) | |

(52) U.S. Cl.
CPC ....... *F01N 13/107* (2013.01); *F02D 41/0055* (2013.01); *F02D 41/0087* (2013.01); *F02D 41/0245* (2013.01); *F02M 26/43* (2016.02); *F01N 13/14* (2013.01); *F01N 2410/03* (2013.01); *F01N 2430/02* (2013.01); *F01N 2430/06* (2013.01); *F01N 2900/1602* (2013.01); *F01N 2900/1621* (2013.01); *F02D 2041/026* (2013.01); *F02D 2200/0802* (2013.01); *Y02T 10/26* (2013.01); *Y02T 10/47* (2013.01)

(56) References Cited

U.S. PATENT DOCUMENTS

| | | |
|---|---|---|
| 6,807,807 B2 | 10/2004 | Kagenishi |
| 6,823,660 B2 | 11/2004 | Minami |
| 6,904,752 B2 | 6/2005 | Foster et al. |
| 6,907,725 B2 | 6/2005 | Szymkowicz et al. |
| 6,915,775 B2 | 7/2005 | Patterson et al. |
| 7,299,623 B2 | 11/2007 | Stanglmaier et al. |
| 7,461,504 B2 | 12/2008 | Warner et al. |
| 7,480,559 B2 | 1/2009 | Groer |
| 7,799,299 B2 | 9/2010 | Robel |
| 7,945,376 B2 * | 5/2011 | Geyer .................. F02M 26/39 123/568.21 |
| 8,534,050 B2 | 9/2013 | Yanakiev et al. |
| 8,806,853 B2 | 8/2014 | Johnson et al. |
| 2006/0096281 A1 | 5/2006 | Huang |
| 2009/0164108 A1 | 6/2009 | Baird et al. |
| 2011/0072791 A1 | 3/2011 | Bidner et al. |
| 2011/0253113 A1* | 10/2011 | Roth .................... F02D 41/008 123/568.12 |
| 2012/0159948 A1* | 6/2012 | Moroi .................... F02D 23/02 60/602 |
| 2013/0291524 A1 | 11/2013 | Shin |
| 2014/0190459 A1* | 7/2014 | Horiuchi .................. F01P 3/20 123/568.12 |
| 2015/0226159 A1* | 8/2015 | Jayakar ............ F02M 35/10295 60/278 |
| 2016/0003134 A1* | 1/2016 | Hodebourg ........... F02B 37/183 123/559.1 |
| 2016/0047341 A1* | 2/2016 | Styles ................. F02D 41/0065 123/568.18 |

* cited by examiner

SYSTEM AND METHOD TO IMPROVE AFTERTREATMENT IN AN INTERNAL COMBUSTION ENGINE

CROSS-REFERENCE TO RELATED APPLICATION

The present application is a continuation of International Application No. PCT/US2015/46549 filed on Aug. 24, 2015, which claims the benefit of the filing date of U.S. Provisional Application Ser. No. 62/040,633 filed on Aug. 22, 2014, each of which is incorporated herein by reference in its entirety.

TECHNICAL FIELD

The present disclosure generally relates to emission control systems for internal combustion engines and, more specifically, to exhaust aftertreatment systems for internal combustion engines.

BACKGROUND

Internal combustion engines, including compression-ignition, spark-ignition engines, and other engines known in the art, may discharge a mixture of water vapor, carbon dioxide, and air pollutants during operation, the mixture commonly referred to as exhaust and the pollutants as emissions. The emissions may include gaseous and solid compounds, including carbon monoxide (CO), unburned hydrocarbons ("UHCs"), oxides of nitrogen (hereafter "$NO_x$" to include nitric oxide (NO) and nitrogen dioxide ($NO_2$)), particulate matter ("PM") such as soot, and sulfur compounds among others. Regulatory emission standards limiting the release of such polluting emissions have become increasingly stringent, making the efficient and effective reduction of emissions a relatively important performance criterion for modern internal combustion engines. As a result, machines powered by internal combustion engines are typically equipped with exhaust aftertreatment systems, including such devices as catalysts, filters, adsorbents, and other devices, to remove regulated emissions from the exhaust and thereby comply with the applicable regulatory exhaust emission standards. Such aftertreatment systems may include one or more of a diesel oxidation catalyst ("DOC"), three-way catalyst, lean $NO_x$ catalyst, selective catalytic reduction ("SCR") catalyst, a filtration component, either catalyzed or uncatalyzed (e.g., a diesel particulate filter ("DPF")), and a cleanup catalyst (e.g., an ammonia oxidation catalyst).

As the amount and types of emissions from an engine may vary depending on the type, size, and/or operating conditions of the engine, so the effectiveness of exhaust aftertreatment devices can vary with engine operating conditions, particularly the temperature of the exhaust generated by the engine. Generally, each type of aftertreatment device has a minimum temperature, commonly referred to as "activation temperature," that enables effective and efficient operation of the aftertreatment device. The rate of emissions removal is generally not sufficient to meet regulatory requirements when the temperature of an aftertreatment device is less than the activation temperature. Moreover, an aftertreatment device may become fouled by emissions when operated below the activation temperature. For example, FIG. 7 shows the effect of temperature on an exemplary SCR device having an activation temperature of around 240° C., illustrating behavior typical for conventional aftertreatment devices. As shown in FIG. 7, below the activation temperature a SCR device tends to adsorb UHCs, which form deposits that clog or foul the SCR device in a way that is difficult to reverse. Above the activation temperature, the SCR device tends to desorb UHCs, which may evaporate off the surfaces of the SCR device at elevated temperatures.

During operation of the engine, the exhaust temperature varies depending on such factors as the engine speed and load and, to some extent, the ambient temperature. Generally, exhaust temperature decreases quickly when the engine is operated under light load, low speed conditions, such as idle. Other operating conditions, such as operating at low speeds in winter weather, can further result in low exhaust temperatures.

SUMMARY

A system and method are disclosed for improving the performance of an aftertreatment system by elevating its temperature above an activation temperature. According to at least one aspect of the present disclosure, the method includes injecting a quantity of a fuel into certain fueled cylinders of a plurality of combustion cylinders of an internal combustion engine, the plurality of combustion cylinders further including non-fueled cylinders. Exhaust from the fueled cylinders is directed through the aftertreatment system while uncombusted gas from the non-fueled cylinders is directed away from the aftertreatment system. Combusting the quantity of fuel in fewer than all of the plurality of combustion cylinders raises the combustion temperature, thereby raising the exhaust temperature and, moreover, the aftertreatment system temperature. In certain embodiments, the uncombusted gas may be directed into an intake manifold in fluid communication with the plurality of combustion cylinders through an orifice, thereby applying an auxiliary load to the engine and further raising the aftertreatment system temperature. The system includes an engine having exhaust valves to control flow of the exhaust and uncombusted gas and a controller configured to perform the operations of the method.

This summary is provided to introduce a selection of concepts that are further described herein in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

BRIEF DESCRIPTION OF THE DRAWINGS

The description herein makes reference to the accompanying drawings where like reference numerals refer to like parts throughout the several views, and where.

DESCRIPTION OF ILLUSTRATIVE EMBODIMENTS

Figure 1:
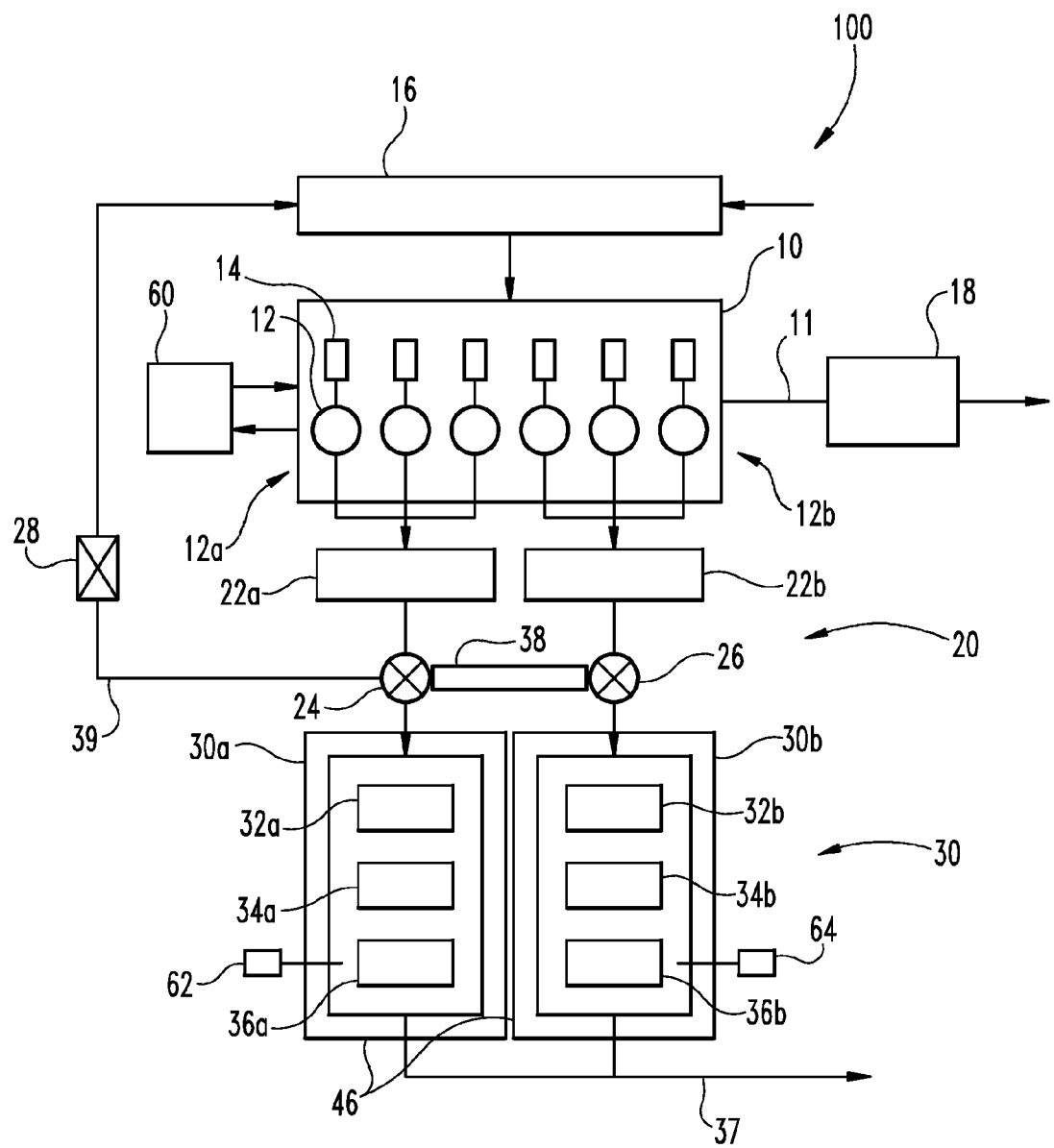
FIG. 1 is a schematic block diagram of an embodiment of an engine system according to the present disclosure.

For the purposes of promoting an understanding of the principles of the disclosure, reference will now be made to the embodiments illustrated in the drawings and specific language will be used to describe the same. It will nevertheless be understood that no limitation of the scope of the disclosure is thereby intended, any alterations and further modifications in the illustrated embodiments, and any further applications of the principles of the invention as illustrated therein as would normally occur to one skilled in the art to which the invention relates, having the benefit of the present disclosure, are contemplated herein.

One aspect of the present disclosure describes methods of improving the performance of an aftertreatment system for an internal combustion engine by raising the temperature of the aftertreatment system to facilitate a relatively increase in efficient and effective operation thereof. Certain of the methods improve aftertreatment system performance without consuming additional fuel. The disclosed methods may be particularly effective where the engine is operated under light load, low speed conditions, such as an idle condition, where the temperature of the exhaust gas generated by the engine may not be adequate to raise the temperature of the aftertreatment system to its minimum activation temperature. In addition to elevating the exhaust temperature, the disclosed methods further facilitate a more complete combustion process within the engine, which prevents fouling of the aftertreatment system due to unburned hydrocarbons ("UHCs"), while further limiting the formation of $NO_x$. The disclosed methods may be employed in any suitable combination depending on the configuration and application of a given engine. Another aspect of the present disclosure describes an engine system structured to perform the disclosed methods.

As shown in FIG. 1, an engine system 100 may include an engine 10 fluidly coupled to an exhaust system 20 having an aftertreatment system 30. The engine 10 may be any type of internal combustion engine, including at least a compression-ignition or spark-ignition engine that uses diesel, gasoline, or natural gas, and/or combinations thereof as a fuel. The engine 10 may comprise a portion of a powertrain for a vehicle, including a mechanical, hydraulic or electric transmission (not shown). In certain embodiments, the engine 10 may comprise a portion of a stationary application such as power generation, drilling, or pumping applications. The engine 10 includes a plurality of combustion chambers or cylinders 12 structured to enable and contain a combustion process, in which a mixture of the fuel and air may be burned to produce mechanical power (e.g., motive power for the vehicle) via the mechanics of the engine 10. The engine 10 may include a plurality of injectors 14 in fluid communication with the cylinders 12 to selectively introduce a prescribed amount of fuel into the cylinders 12 to enable the combustion process. In certain embodiments, the engine 10 may include one injector 14 for each cylinder 12. In alternative embodiments, the engine 10 may include fewer or more injectors 14 than cylinders 12. Moreover, the engine 10 may include a plurality of cylinder valves (not shown) moveably connected to the cylinders 12 to control the flow of charge gas into and exhaust gas out of the cylinders 12.

The engine 10 may include an intake manifold 16 in fluid communication with the cylinders 12, such that the intake manifold 16 enables an intake flow of charge gas into each of the cylinders 12 via the cylinder valves. The intake flow of charge gas may include ambient and compressed air, recirculated exhaust gas, and other gases as described further herein. The engine 10 may further include the exhaust system 20 in fluid communication with the cylinders 12 of the engine 10, the exhaust system 20 structured to enable the flow of post-combustion exhaust gas from each of the cylinders 12 via the cylinder valves to the surrounding environment. The exhaust system 20 may include a first exhaust manifold 22a and a second exhaust manifold 22b. The first exhaust manifold 22a may be in fluid communication with a first group 12a of the cylinders 12, and the second exhaust manifold 22b may be in fluid communication with a second group 12b of the cylinders 12.

Though the engine 10 illustrated in FIG. 1 includes six cylinders 12 with three cylinders in the first group 12a and the remaining three cylinders in the second group 12b, the engine 10 may include any number of cylinders 12. Moreover, the first and second groups 12a, 12b need not have equal numbers of associated cylinders 12. For example, the engine 10 may include eight cylinders 12, including two cylinders 12 in the first group 12a, each in fluid communication with the first exhaust manifold 22a, and six cylinders 12 in the second group 12b, each in fluid communication with the second exhaust manifold 22b. Further, the exhaust system 20 may include any appropriate number of exhaust manifolds in fluid communication with the total number of cylinders 12.

The aftertreatment system 30 of the exhaust system 20 may include a first aftertreatment unit 30a and a second aftertreatment unit 30b, each structured to eliminate, or at least reduce, unwanted regulated emissions from the exhaust gas flowing therethrough. Each of the first and second aftertreatment unit 30a, 30b may include any suitable aftertreatment component, including a diesel oxidation catalyst ("DOC"), three-way catalyst ("TWC"), lean $NO_x$ catalyst, selective catalytic reduction ("SCR") catalyst, a filtration component, either catalyzed or uncatalyzed (e.g., a diesel particulate filter ("DPF")), a cleanup catalyst (e.g., an ammonia oxidation catalyst), and other types of aftertreatment devices, collectively referred to as aftertreatment components. As depicted in FIG. 1, the first aftertreatment unit 30a may include at least a first DOC 36a, a first DPF 34a, and/or a first SCR 32a. Likewise, the second aftertreatment unit 30b may include at least a second DOC 36b, a second DPF 34b, and/or a second SCR 32b. Each of the first and second aftertreatment unit 30a, 30b may include more than one of the named aftertreatment components and/or, alternatively, other appropriate components.

The first aftertreatment unit 30a may be in fluid communication with both the first and second exhaust manifolds 22a, 22b via an exhaust line 38. Moreover, the second aftertreatment unit 30b may be in fluid communication with both the first and second exhaust manifolds 22a, 22b via the exhaust line 38. The flow of exhaust gas from the first and second exhaust manifolds 22a, 22b through the exhaust system 20 may be regulated and directed by exhaust valves. In at least one embodiment, the flow of exhaust gas from the first exhaust manifold 22a may be controlled by a first exhaust valve 24 included in the exhaust line 38 between the first and second exhaust manifolds 22a, 22b and the aftertreatment system 30, specifically the first aftertreatment unit 30a. In at least one embodiment, the flow of exhaust gas from the second exhaust manifold 22b may be controlled by a second exhaust valve 26 included in the exhaust line 38 between the first and second exhaust manifolds 22a, 22b and the aftertreatment system 30, specifically the second aftertreatment unit 30b.

The first and second exhaust valves 24, 26 enable the flow of exhaust gas from both the first and second exhaust manifolds 22a, 22b to be selectively directed through either the first aftertreatment unit 30a or the second aftertreatment unit 30b or both. For example, in an exemplary configuration, the first exhaust valve 24 may be adjusted to direct exhaust gas from the first exhaust manifold 22a into the second aftertreatment unit 30b, and the second exhaust valve 26 may direct exhaust gas from the second exhaust manifold 22b into the second aftertreatment unit 30b. In such a configuration, all of the exhaust gas generated in the engine 10 may be directed through the second aftertreatment unit 30b. In another exemplary configuration, the second exhaust valve 26 may be adjusted to direct exhaust gas from the second exhaust manifold 22b into the first aftertreatment unit 30a, and the first exhaust valve 24 may further be adjusted to direct exhaust gas from the first exhaust manifold 22a into the first aftertreatment unit 30a. In such a configuration, all of the exhaust gas generated in the engine 10 may be directed through the first aftertreatment unit 30a. Alternatively, the first exhaust valve 24 may be adjusted to direct exhaust gas from the first exhaust manifold 22a into the first aftertreatment unit 30a, and the second exhaust valve 26 may be adjusted to direct exhaust gas from the second exhaust manifold 22b into the second aftertreatment unit 30b. As may be appreciated by one skilled in the art, other flow configurations are made possible by the first and second exhaust manifolds 22a, 22b and the first and second exhaust valves 24, 26.

The first and second exhaust valves 24, 26 may be any suitable multi-position valve capable of being activated by a signal to route the flows of exhaust gas and uncombusted charge gas as described herein. For example, the first and second exhaust valves 24, 26 may include three-way valves structured to direct the flows to the first aftertreatment unit 30a, to the second aftertreatment unit 30b, or away from either the first or second aftertreatment system 30a, 30b. In such an embodiment, the first and second exhaust valves 24, 26 may be combined into a single valve capable of routing the flows of exhaust and uncombusted gas as described herein.

The engine system 100 may include an orifice 28 disposed in a recirculation line 39 that extends from the exhaust system 20 to the intake manifold 16. The orifice 28 may be any suitable restriction, adjustable or fixed, such as a throttle valve. In certain embodiments, the recirculation line 39 may extend from the first and second exhaust manifolds 22a, 22b to the intake manifold 16 via the corresponding first or second exhaust valve 24, 26 as illustrated in FIG. 1. In at least one embodiment, the recirculation line 39 includes a line from the first exhaust manifold 22a to the orifice 28 and a second, separate line from the second exhaust manifold 22b to the orifice 28, which may be connected to the intake manifold 16 by the single, integrated recirculation line 39. The recirculation line 39 may enable at least a portion of the exhaust gas generated in the engine 10 to be recirculated from the exhaust system 20 to the intake manifold 16, thereby selectively enabling high pressure, uncooled exhaust gas recirculation ("EGR").

In at least one embodiment according to the present disclosure as shown in FIG. 1, the engine system 100 may include a controller 60 in communication with the engine 10, the controller 60 structured to perform certain operations to control the functions of the engine system 100 and improve the performance of the aftertreatment system 30. For example, the controller 60 may be structured to command operations to control the flow of exhaust gas through the exhaust system 20 and to control the injection of fuel into select cylinders 12. The controller 60 may be structured to control command parameters of the engine 10, which may include operational settings for those components of the engine system 100 that may be controlled with an actuator activated by the controller 60. In certain embodiments, the controller 60 may be a portion of a processing subsystem including one or more computing devices having memory, processing, and communication hardware. The controller 60 may be a single device or a distributed device, and the functions of the controller 60 may be performed by hardware or software. The controller 60 may comprise digital circuitry, analog circuitry, or a hybrid combination of both of these types. The controller 60 may include one or more Arithmetic Logic Units (ALUs), Central Processing Units (CPUs), memories, limiters, conditioners, filters, format converters, or the like which are not shown to preserve clarity.

Further, the controller 60 may be programmable, an integrated state machine, or a hybrid combination thereof. In at least one embodiment, the controller 60 is programmable and executes algorithms and processes data in accordance with operating logic that is defined by programming instructions such as software or firmware. Alternatively or additionally, operating logic for the controller 60 may be at least partially defined by hardwired logic or other hardware. It should be appreciated that the controller 60 may be dedicated exclusively to improving the performance of the aftertreatment system 30 or may further be used in the regulation, control, and/or activation of one or more other subsystems or aspects of the engine system 100.

Certain operations described herein include operations to interpret one or more parameters. Interpreting, as utilized herein, includes receiving values by any method known in the art, including at least receiving values from a datalink or network communication, receiving an electronic signal (e.g., a voltage, frequency, current, or pulse-width modulation (PWM) signal) indicative of the value, receiving a software parameter indicative of the value, reading the value from a memory location on a non-transient computer readable storage medium, receiving the value as a run-time parameter by any means known in the art, and/or by receiving a value by which the interpreted parameter can be calculated, and/or by referencing a default value that is interpreted to be the parameter value.

To operate effectively, it is desirable that the aftertreatment system 30 attain a minimum operating temperature, referred to as the activation temperature. However, in embodiments in which the aftertreatment system 30 is comprised of separate aftertreatment components (i.e., the first DOC 36a, the first DPF 34a, and the first SCR 32a), the aftertreatment system 30 may not have a single activation temperature. Instead, the first DOC 36a, the first DPF 34a, and the first SCR 32a may each have its own activation temperature. Nonetheless, for simplicity of explanation, the activation temperature of the aftertreatment system 30 may be considered the activation temperature of the aftertreatment component having the lowest such temperature. For example, in embodiments that include the first SCR 32a, the activation temperature of the aftertreatment unit 30a may be around 240° C., which may be the activation temperature to pyrolyze UHCs from an exemplary SCR 32a. As a further example, the critical temperature to pyrolyze carbon build-up from the aftertreatment system 30 may be about 325° C. in the case of coke and 400° C. in the case of soot build-up. Regardless of the specific contaminate or aftertreatment component at issue, the engine system 100 may be configured to attain any appropriate activation temperature.

The temperature of an aftertreatment system is generally dependent upon the temperature of the exhaust gas flowing therethrough for treatment. When a conventional engine is operated at low loads and speeds, such as idling for long periods of time, the exhaust gas temperature is typically well below the activation temperature of a conventional aftertreatment system. Engine operation in cold ambient environments may further suppress exhaust gas temperature. Under such operating conditions, an aftertreatment system of a conventional engine may not function properly and may be prone to fouling due to the presence of significant concentrations of UHCs in the exhaust gas, which tend to increase under such low load, cold ambient conditions that suppress exhaust gas temperature.

The engine system 100 enables various novel means of ensuring that the aftertreatment system 30 attains the desired activation temperature. In a standard mode of operation, the fuel may be supplied to each of the cylinders 12 substantially evenly and in a quantity (hereinafter, "the demanded fuel") sufficient to meet the current demand for torque and/or power from the engine 10. According to at least one embodiment of the present disclosure, the engine system 100 may further operate in a regeneration mode to increase the temperature of at least a portion of the aftertreatment system 30. In the regeneration mode, the engine system 100 may supply the demanded fuel to only a portion of the cylinders 12 (e.g., the first group 12a) and concurrently generate enough power to meet the current torque and/or power demand on the engine 10. In such an embodiment, the remaining portion of the cylinders (e.g., the second group 12b) is not supplied with any fuel. In such a configuration, the cylinders 12 supplied with the demanded fuel may be referred to as the "fueled cylinders," and the remaining cylinders 12 may be referred to as the "non-fueled cylinders." Further, in the regeneration mode, the engine system 100 may route exhaust gas generated in the fueled cylinders into the aftertreatment system 30 (i.e., the first aftertreatment unit 30a and/or second aftertreatment unit 30b) and route the gas discharged from the non-fueled cylinders away from the aftertreatment system 30. Because no fuel is supplied for combustion, the gas discharged from the non-fueled cylinders is uncombusted charge gas.

For example, in at least one configuration, the controller 60 may command the injectors 14 associated with the first group 12a of cylinders 12 to not inject any fuel into the first group 12a, making the first group 12a the non-fueled cylinders. Further, the controller 60 may command the injectors 14 associated with the second group 12b of cylinders 12 to inject all of the demanded fuel into the second group 12b, making the second group 12b the fueled cylinders. Accordingly, in an embodiment in which there are equal numbers of cylinders 12 in the first and second group 12a, 12b, the fueled cylinders are supplied with twice as much fuel in the regeneration mode than under standard mode operating conditions. Because all of the demanded fuel is supplied to the second group 12b in the example embodiment, the combustion temperature in the second group 12b (i.e., the fueled cylinders) is increased, as is the temperature of the exhaust gas discharged into the second exhaust manifold 20b, relative to the standard mode of operation. Depending on the embodiment, the fueled cylinder may comprise between about 25% to 75% of the plurality of cylinders 12.

Supplying all of the demanded fuel to only a portion of the cylinders 12 increases the combustion temperature at least in part by lowering the air-fuel ratio of the charge mixture burned in the fueled cylinders. Certain types of engines, such as conventional compression-ignition engines, normally operate at relatively high air-fuel ratios (e.g., about 150:1), particularly at low speed, low load conditions, meaning the mixture of fuel and charge gas introduced into the engine cylinders includes more air (i.e., oxygen) than needed to combust the quantity of fuel introduced. At low load conditions, the excess air in a high air-fuel ratio mixture tends to dilute or suppress the combustion temperature of the charge mixture and, thus, the exhaust gas temperature. Conversely, lower air-fuel ratios tend to increase combustion temperature because less air mass, having a certain thermal capacitance, is present in the charge mixture to absorb the heat generated from the exothermic combustion process. Therefore, lower air-fuel ratios generally increase combustion temperature, which in turn raises exhaust gas temperature and the temperature of the aftertreatment system 30.

As described herein, the engine system 100 enables lower than typical air-fuel ratios by selectively introducing all of the demanded fuel into fewer than all of the cylinders 12, resulting in a lesser total volume of air for a given quantity of demanded fuel and, thus, a lower air-fuel ratio. Moreover, because low speed, low load conditions (e.g., idling conditions) are generally outside the operating range of a conventional turbocharger, additional fuel will not cause a conventional response from the turbocharger in such an embodiment. An unresponsive turbocharger does not increase the air-fuel ratio by introducing compressed charge gas (i.e., boost) into the engine, nor does it draw energy from the enthalpy of the exhaust gas. Accordingly, at low speed conditions, the reduction in air-fuel ratio by selectively introducing all of the demanded fuel into fewer than all of the cylinders 12 is not counteracted by boost from a turbocharger.

Other means of lowering the air-fuel ratio may yield undesirable side effects. For example, the air-fuel ratio could be lowered by throttling the incoming flow of charge gas into the intake manifold. However, such an approach tends to create a vacuum in the cylinders, which may draw or suck lubricating oil passed piston rings and other seals within the cylinders, leading to excessive lubrication oil consumption and increased concentrations of UHCs in the exhaust gas discharged from the engine. The engine system 100 enables reduced air-fuel ratios without such negative effects.

Supplying all of the demanded fuel to only a portion of the cylinders 12 may further increase the efficacy of the injectors 14, thereby reducing the concentration of UHCs in the exhaust gas that may foul or contaminate the aftertreatment components of the aftertreatment system 30. Generally, fuel injectors are more effective and produce a higher quality spray of fuel when injecting more than the small amount of fuel typical of low speed, low load conditions. Conventional fuel injectors typically produce a low quality spray of fuel when injecting comparatively small quantities of fuel because producing such small quantities results in a large pressure drop within the injector and relatively low injection pressure. The low injection pressure yields a spray of fuel that penetrates into the cylinder volume poorly, includes relatively large droplets, and thus does not burn efficiently. Conversely, in the engine system 100, though total quantity of fuel remains the same, the quantity of fuel injected by each injector 14 during each engine cycle is greater because all of the demanded fuel is injected through a reduced number of injectors 14.

Without being held to a specific theory, a larger quantity of fuel requires a needle within the injector to lift higher, which lowers the pressure drop within the injector and enables the fuel to be injected into the cylinder at a higher pressure. The higher pressure yields a spray of fuel that penetrates further into the cylinder with finer fuel droplets (i.e., increased atomization) that burn more completely. The result is a higher combustion temperature and a more complete combustion process that produces fewer UHCs that may contaminate downstream aftertreatment components in the aftertreatment system 30. For instance, one study of an embodiment of the engine system 100 operating at low engine speed and light load indicated that injecting all of the demanded fuel into half of the cylinders 12 lowered the concentration of UHCs produced by about 66%. Therefore, supplying all of the demanded fuel to only a portion of the cylinders 12 has been demonstrated to further increase the efficacy of the injectors 14, generating higher combustion temperatures to raise the temperature of the aftertreatment system 30 and reducing the concentration of UHCs in the exhaust gas that may foul or contaminate the aftertreatment components of the aftertreatment system 30.

Operating in the regeneration mode, exhaust gas generated in and discharged from the fueled cylinders, for example the second group 12b, may be directed via the second exhaust manifold 22b and the second exhaust valve 26 through a single aftertreatment unit, for example the second aftertreatment unit 30b. Therefore, relatively hot exhaust gas, made hotter still due to the additional fuel supplied, is routed through only one aftertreatment unit, for example, the second aftertreatment unit 30b, thereby raising its temperature higher and more quickly than if the exhaust were split between both the first and second aftertreatment units 30a, 30b. Concurrently, the cylinders 12 of the first group 12a continue to accept incoming an intake flow of charge gas from the intake manifold 16, but because the injectors 14 associated with the first group 12a are not supplying fuel, combustion does not occur in the non-fueled cylinders, and no exhaust gas is produced therein. Instead, relatively cool, uncombusted, "non-fueled" charge gas is discharged from the non-fueled first group 12a into the first manifold 22a.

To prevent the relatively cool, uncombusted gas from affecting the temperature of the second aftertreatment unit 30b, the uncombusted, non-fueled gas from the first manifold 22a may be routed away from the second aftertreatment unit 30b. In certain embodiments, the non-fueled gas may be routed through the first aftertreatment unit 30a. Though relatively cold, the non-fueled gas may include only negligible amounts of UHCs that could foul the components of the first aftertreatment unit 30a. Moreover, because the non-fueled gas does not include significant amounts of any regulated emissions, the first aftertreatment unit 30a can be inactive and need not treat the gas nor attain an activation temperature. Therefore, the cool non-fueled gas may be isolated from the relatively hot exhaust gas and the active second aftertreatment unit 30b without negatively affecting the inactive first aftertreatment unit 30a.

In embodiments of the engine system 100 including only one aftertreatment unit, the cool non-fueled gas may be either discharged directly to the environment from the first manifold 20a or recirculated to the intake manifold 16 via the recirculation line 39. In some embodiments, an internal combustion engine has a plurality of combustion cylinders in fluid communication with an intake manifold structured to supply the cylinders with charge gas. Each cylinder includes a fuel injector capable of selectively supplying each cylinder with a fuel. Each of two or more exhaust manifolds are in fluid communication with at least a portion of the cylinders and structured to enable exhaust gas generated in the cylinders to exit the engine. The one aftertreatment unit is in fluid communication with at least one exhaust manifold. An exhaust line connects the exhaust manifolds to the one aftertreatment unit. A first exhaust flow value is disposed in the exhaust line between the exhaust manifolds and the one aftertreatment unit. The first exhaust flow value is structured to selectively direct the exhaust gas from at least one of the exhaust manifolds away from the one aftertreatment unit and to selectively direct the exhaust from at least one other exhaust manifold through the one aftertreatment unit. The fuel is supplied to a portion of the plurality of cylinders, the exhaust gas from which is directed to the one aftertreatment unit, while charge gas from the remaining portion of the plurality of cylinders is directed away from the one aftertreatment unit.

The selection of which specific cylinders 12 are the fueled cylinders and which are the non-fueled cylinders may be varied for the given operating conditions depending on which aftertreatment unit is to be used and, under certain conditions, regenerated. In embodiments where certain cylinders 12 are plumbed to a specific aftertreatment unit, the fueled cylinders depend directly on the aftertreatment unit to be used. For example, in an embodiment where the first group 12a of cylinders 12 is connected to the first aftertreatment unit 30a via the first exhaust manifold 22a, the first group 12a will be the fueled cylinders when the first aftertreatment unit 30a is identified for use. In embodiments where the first and second exhaust valves 24, 26 enable exhaust gas from either the first or second group 12a, 12b to be routed through either the first or second aftertreatment unit 30a, 30b, either the first or second group 12a, 12b may be the fueled cylinders where the first aftertreatment unit 30a is identified for use. Moreover, the aftertreatment unit to be used may be alternated or changed as desired to ensure relatively equal usage and regeneration of the aftertreatment units.

In at least one embodiment, all cylinders 12 may be supplied with fuel, but the exhaust gas generated therefrom may be routed through either the first aftertreatment unit 30a or the second aftertreatment unit 30b. However, in such an embodiment, the air-fuel ratio is not changed, thus the temperature increase of the exhaust gas is less than in embodiments where all demanded fuel is supplied to only a portion of the cylinders 12, namely the fueled cylinders.

In at least one embodiment, the cool, non-fueled gas may be directed and recirculated into the intake manifold 16 via the recirculation line 39 and the orifice 28. Recirculation of the non-fueled gas into the intake manifold 16 provides several practical benefits, including muffling the noise generated in the non-fueled cylinders and emitted from the exhaust manifold 22a where the aftertreatment system 30 is bypassed. Benefits may further include reintroducing lubrication oil that may migrate from the non-fueled cylinders back into the engine 10 where the oil may be either reabsorbed into the lubricant system or burned in the fueled cylinders, thereby preventing unburned lubrication oil from fouling or poisoning the aftertreatment system 30. In certain embodiments, the migration of lubrication oil from the non-fueled cylinders may be mitigated by selectively lowering the oil pressure in the non-fueled cylinders. Moreover, recirculation of the non-fueled gas may further raise the temperature of the exhaust gas by at least partially preheating the intake flow. The recirculated non-fueled gas becomes hotter due to the pumping work performed on it and heat transferred to it with repeated passes through the engine 10, and some portion of the recirculated non-fueled gas is introduced into the fueled cylinders due to mixing in the intake manifold 16, thereby preheating the intake flow.

The engine system 100 enables an auxiliary torque load to be applied to the engine 10 requiring only incremental additional fuel. In at least one embodiment, the orifice 28 may be an adjustable valve in communication with the controller 60 such that flow therethrough may be selectively restricted to varying degrees. In such embodiments, the orifice 28 may be used selectively to increase the pumping work of the non-fueled cylinders, which, like an air compressor, must perform work to push the non-fueled gas out of the non-fueled cylinders and through the orifice 28. Because the torque to perform the pumping work must be supplied by the fueled cylinders, the orifice 28 can create a load on the engine 10, a load that may be adjusted, independent of the power demanded by an operator, using the adjustable orifice 28. The increased load on the engine 10 increases the demanded power/torque, which increases the demanded fuel combusted, thereby increasing the temperature of the exhaust gas generated in the fueled cylinders. Consequently, the increased exhaust gas temperature increases the temperature of the aftertreatment system 30. By enabling adjustment of the load on the engine 10 independent of the operator demand, the orifice 28 enables the controller 60 to selectively consume additional fuel to raise the temperature of the aftertreatment system 30 as needed to attain the activation temperature, which may be particularly desirable at low load conditions as described herein.

In at least one embodiment according to the present disclosure, as shown in FIG. 1, the engine system 100 may include an electromagnetic generator 18 mechanically coupled to an output shaft 11 of the engine 10 and in communication with the controller 60. In certain applications of the engine system 100, torque generated by the engine 10 may be used to power the electromagnetic generator 18 to generate electrical power. As a non-limiting example, the engine system 100 may be employed in a diesel-electric locomotive, in which the engine 10 drives the generator 18, output from which supplies electrical power to traction motors that drive the wheels of the locomotive. In such an application, the engine 10 is not mechanically connected to the wheels. Thus, excess power generated by the engine 10 may be alternately discharged to the environment as waste heat via the generator 18 independent of the actual power demand, or to a heater grid mounted inside the exhaust pipe which raises the temperature of the exhaust gas. Accordingly, in at least one embodiment of the present disclosure, the load on the engine 10 may be increased using the generator 18, regardless of whether the engine system 100 is providing motive power. In such an embodiment, the controller 60 may command the generator 18 to load the engine 10 in excess of the demanded power. The added load of the generator 18 causes additional fuel to be injected into the fueled cylinders, thereby increasing the temperature of the exhaust gas due to an increase in the combustion temperature resulting in an increase in the temperature of the aftertreatment system 30 and improved performance thereof. In such an embodiment, the controller 60 may selectively vary the load on the engine 10 as needed to raise the temperature of the aftertreatment system 30 above the activation temperature, particularly at low operator demanded load conditions.

In at least one embodiment according to the present disclosure, the aftertreatment system 30 may be insulated with an insulation 46 to prevent heat loss from the relatively hot exhaust gas to the environment. As shown in FIG. 1, the insulation 46 may at least partially envelop both the first aftertreatment unit 30*a* and the second aftertreatment unit 30*b*. Moreover, the insulation 46 may extend to envelop at least a portion of the exhaust line 38. The insulation 46 may envelop the entire exhaust gas path through the exhaust system 20, from the first and second exhaust manifolds 22*a*, 22*b* to an outlet 37 of the first and second aftertreatment units 30*a*, 30*b*. In certain embodiments, the insulation 46 may further envelop the recirculation line 39 to maintain the temperature of the non-fueled gas flowing therethrough. Accordingly, the insulation 46 can reduce the temperature drop between the first and second exhaust manifolds 22*a*, 22*b* and the outlet 37 of the aftertreatment system 30, thereby substantially maintaining the temperature of the exhaust gas through the exhaust system 20 to further elevate the temperature of the aftertreatment system 30. The insulation 46 may be any suitable material capable of withstanding the temperatures of the exhaust system 20 and the environmental and service conditions of a given application in which the engine system 100 is employed.

The insulation 46 may be particularly effective where the engine system 100 is employed in large-scale industrial applications and, more particularly, in cold operating environments. For instance, where the engine system 100 is employed in a large vehicle (e.g., one used in mining operations), the distance between the engine 10 and the aftertreatment system 30 may be at least 6 meters (m) or about 20 feet (ft). Significant drops in the temperature of the exhaust gas may be observed due to heat transfer from the exhaust line 38 in such applications, particularly where operating in cold ambient conditions. Consequently, the insulation 46 assists in maintaining the temperature of the exhaust gas through the exhaust system 20, which may significantly increase the temperature of the aftertreatment system 30, especially at low loads where the exhaust gas temperature may be least.

The aftertreatment system 30 may further include one or more temperature sensors. In at least one embodiment, a first temperature sensor 62 may be disposed in communication with the flow of exhaust gas through the first aftertreatment unit 30*a*. Moreover, a second temperature sensor 64 may be disposed in communication with the flow of exhaust gas through the second aftertreatment unit 30*b*. The temperature of the flow of exhaust gas through the aftertreatment system 30 may be monitored as a proxy of the temperature of the aftertreatment system 30. Each of the first and second temperature sensors 62, 64 may be any suitable type of device, including but not limited to a thermocouple, thermistor, and pyrometer. The first and second temperature sensors 62, 64 may be in communication with the controller 60 to provide feedback on the performance of the first and second aftertreatment units 30*a*, 30*b*. For example, the first temperature sensor 62 may provide information indicating that the aftertreatment unit 30a is below the activation temperature, thereby triggering the controller 60 to initiate the regeneration mode of operation to raise the temperature of the aftertreatment unit 30a. Moreover, the first temperature sensor 62 may provide information indicating that the aftertreatment unit 30a is above the activation temperature, thereby triggering the controller 60 to switch from the regeneration mode to another mode of operation, such as the standard mode.

In certain embodiments, the first temperature sensor 62 may include several such sensors, each in communication with the controller 60 and one of the aftertreatment components, namely the DOC 36a, the DPF 34a, and/or the SCR 32a. In such an embodiment, the controller 60 may initiate the regeneration mode according to the activation temperature of each given aftertreatment component. In certain other embodiments, the first temperature sensor 62 may include such sensors positioned both upstream and downstream of the aftertreatment unit 30a and/or one or more aftertreatment components such that a temperature change across each may be determined by the controller 60. Because generally the treatment of certain, specific regulated emissions may be exothermic, a measured temperature rise across a given aftertreatment component may indicate that the aftertreatment unit 30a is operating effectively. The second temperature sensor 64 may be similarly configured within the aftertreatment unit 30b.

Figure 2:
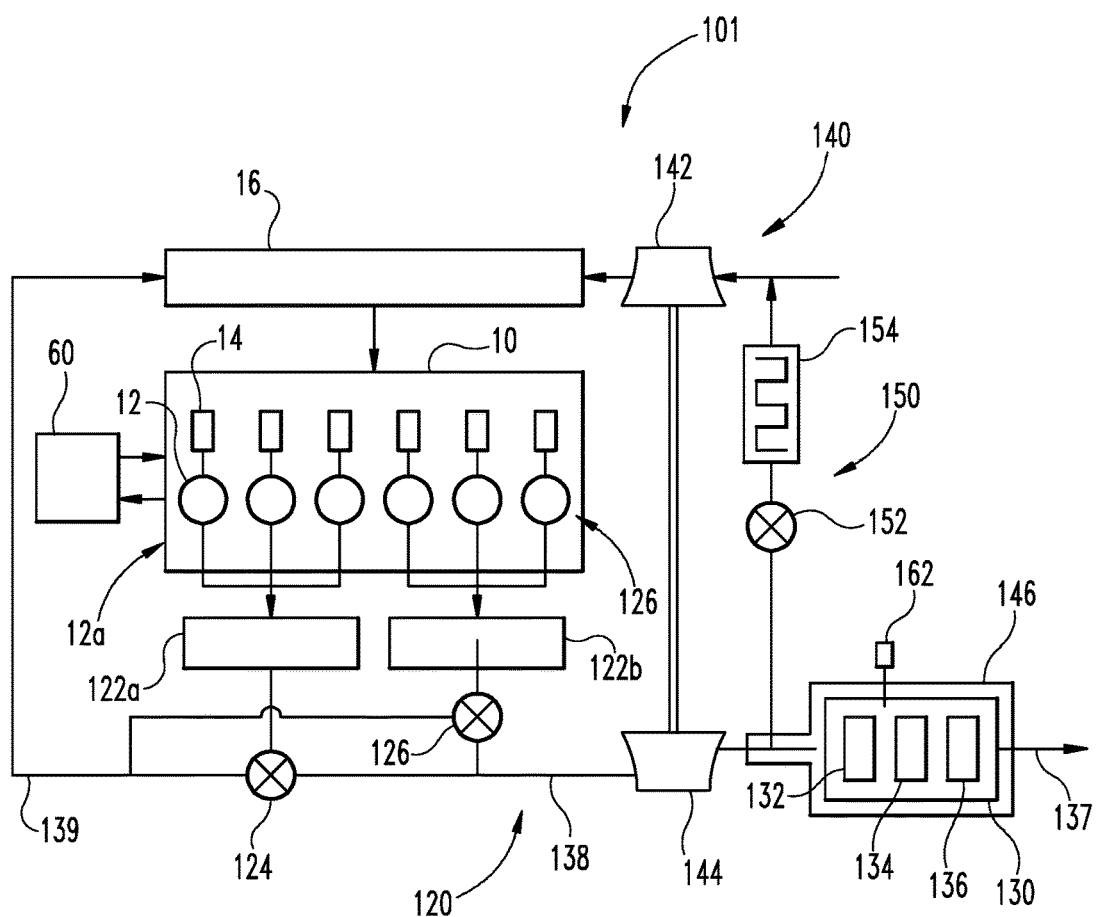
FIG. 2 is a schematic block diagram of another embodiment of an engine system according to the present disclosure.

Another embodiment according to the present disclosure, an engine system 101, is shown in FIG. 2. The engine system 101 may include the engine 10 having the cylinders 12 divided between the first group 12a and second group 12b, each cylinder 12 in fluid communication with the intake manifold 16 and supplied with fuel via the injectors 14. The engine system 101 may further include the controller 60.

The engine system 101 may include an exhaust system 120 in fluid communication with the engine 10, the exhaust system 120 structured to enable the flow of post-combustion exhaust gas from each of the cylinders 12 via the cylinder valves to the surrounding environment. The exhaust system 120 may include a first exhaust manifold 122a and a second exhaust manifold 122b. The first exhaust manifold 122a may be in fluid communication with the first group 12a of the cylinders 12, and the second exhaust manifold 122b may be in fluid communication with the second group 12b. Though the engine 10 illustrated in FIG. 2 includes six cylinders 12 with three cylinders in the first group 12a and the remaining three cylinders in the second group 12b, the engine 10 may include any number of cylinders 12. Moreover, the first and second groups 12a, 12b need not have equal numbers of associated cylinders 12. Further, the exhaust system 120 may include any appropriate number of exhaust manifolds in fluid communication with the total number of cylinders 12.

The exhaust system 120 may include an aftertreatment unit 130 structured to eliminate, or at least reduce, unwanted regulated emissions from the exhaust gas flowing therethrough. The aftertreatment unit 130 may include any suitable aftertreatment component, including a DOC 136, a DPF 134, and/or a SCR 132, collectively referred to as aftertreatment components, as depicted in FIG. 2. The aftertreatment unit 130 may include more than one of the named aftertreatment components and/or, alternatively, other appropriate components. Though one aftertreatment unit 130 is shown in FIG. 2, in at least one embodiment the engine system 101 may include more than one aftertreatment unit 130. The aftertreatment unit 130 may be fluidly connected to the first and second exhaust manifolds 122a, 122b via an exhaust line 138. The flow of exhaust gas from the first exhaust manifold 122a may be regulated and directed by a first exhaust valve 124 disposed in the exhaust line 138 between the first exhaust manifold 122a and the aftertreatment unit 130. The flow of exhaust gas from the second exhaust manifold 122b may be regulated and directed by a second exhaust valve 126 disposed in the exhaust line 138 between the second exhaust manifold 122b and the aftertreatment unit 130.

The first exhaust valve 124 enables the flow of exhaust gas from the first exhaust manifold 122a to be selectively directed through either the aftertreatment unit 130 or a recirculation line 139, which fluidly connects the first exhaust manifold 122a to the intake manifold 16. Likewise, the second exhaust valve 126 enables the flow of exhaust gas from the second exhaust manifold 122b to be selectively directed through either the aftertreatment unit 130 or the recirculation line 139 that further fluidly connects the second exhaust manifold 122b to the intake manifold 16. Consequently, the first exhaust valve 124 and the second exhaust valve 126 enable the flow of exhaust gas from both the first exhaust manifold 122a and second exhaust manifold 122b to be routed through the aftertreatment unit 130. Further, the first exhaust valve 124 and second exhaust valve 126 enable the flow of exhaust gas from either the first exhaust manifold 122a or second exhaust manifold 122b to be routed through the aftertreatment unit 130 while exhaust gas from the other exhaust manifold may be routed via the recirculation line 139 into the intake manifold 16. In certain embodiments, the first exhaust valve 124 and the second exhaust valve 126 may further enable the flow of exhaust gas from either the first exhaust manifold 122a and/or second exhaust manifold 122b to the environment.

As described herein with respect to the engine system 100, the engine 10 and controller 60 of the engine system 101 enable fuel to be selectively supplied to certain cylinders 12 and not to others. For example, in at least one embodiment, the controller 60 may command the injectors 14 associated with the first group 12a of cylinders 12 to not inject any fuel into the first group 12a, making the first group 12a the non-fueled cylinders. Further, the controller 60 may command the injectors 14 associated with the second group 12b of cylinders 12 to inject all of the demanded fuel into the second group 12b, making the second group 12b the fueled cylinders. In such an embodiment, because all of the demanded fuel is supplied to the fueled second group 12b, the combustion temperature in the fueled cylinders is increased, as is the temperature of the exhaust gas discharged into the second exhaust manifold 122b. Moreover, exhaust gas generated in and discharged from the fueled cylinders may be directed via the second exhaust manifold 122b and the second exhaust valve 126 through the aftertreatment unit 130. Therefore, relatively hot exhaust gas, made hotter still by the additional fuel supplied, is routed through the aftertreatment unit 130, thereby raising its temperature.

As described herein with respect to the engine system 100, in an exemplary embodiment of the engine system 101, in which the first group 12a is not supplied with fuel, relatively cool, uncombusted, non-fueled charge gas is discharged from the non-fueled first group 12a into the first manifold 122a. To prevent the relatively cool, non-fueled gas from affecting the temperature of the aftertreatment unit 130, the non-fueled gas from the first manifold 122a may be routed away from the aftertreatment unit 130, for instance into the intake manifold 16 via the recirculation line 139 or directly to the environment. Accordingly, the first exhaust valve 124 and second exhaust valve 126 enable the controller 60 to route all of the relatively hot exhaust gas generated by the fueled cylinders of the engine 10 through the aftertreatment unit 130 while concurrently routing all of the relatively cool, non-fueled gas away from the aftertreatment unit 130, thereby maximizing the temperature of the aftertreatment unit 130 for the given operating conditions.

In at least one embodiment according to the present disclosure, the engine system 101 may include a turbocharger 140 in communication with the exhaust line 138 and the intake manifold 16 as shown in FIG. 2. The turbocharger 140 may include a turbine 142 in fluid communication with the flow of exhaust gas exiting the first and second exhaust manifolds 122a, 122b. The turbine 142 may be disposed upstream of the aftertreatment unit 130 and be structured to convert at least a portion of the energy of the relatively hot and high pressure exhaust gas into a mechanical torque. The turbocharger 140 may further include a compressor 144 in fluid communication with the flow of charge gas upstream of the intake manifold 16 and driven by the torque generated by the turbine 142. The compressor 144 may be structured to compress the charge gas and push an increased mass of charge gas through the intake manifold 16 and into the cylinders 12, thereby increasing the power output of the engine 10 in proportion to the mass of the charge gas pushed into the cylinders 12. The turbocharger 140 may include, but not be limited to, a multiple stage turbocharger, a variable geometry turbocharger (VGT), or a turbocharger having a wastegate or bypass valve in certain embodiments. Additionally or alternatively, the engine system 100 may include a mechanically driven supercharger (not shown) in communication with the intake manifold 16 and capable of pushing compressed charge gas through the intake manifold 16 and into the engine 10.

In at least one embodiment, the engine system 100 may further include an exhaust gas recirculation ("EGR") system 150. The EGR system 150 may be disposed between the exhaust line 138 and the intake manifold 16 and may be structured to recirculate at least a portion of the exhaust gas discharged by the engine 10 via the first and second exhaust manifolds 122a, 122b into the intake manifold 16 and back into the engine 10. Exhaust gas routed back into the engine 10 via the EGR system 150 may be referred to as "EGR gas" and, thus, comprise a portion of the charge gas in certain embodiments. The EGR system 150 may include an EGR valve 152 structured to regulate and synchronize the flow of exhaust gas through the EGR system 150. The EGR system 150 may further include an EGR cooler 154 structured to transfer heat from the exhaust gas routed therethrough. The EGR cooler 154 may be any type of suitable heat exchanger and, by cooling the exhaust gas flowing through the EGR system 150, may increase the mass of the EGR gas routed back into the intake manifold 16. In at least one embodiment, the EGR system 150 may include a bypass line (not shown) to selectively bypass the EGR cooler 154 and route uncooled exhaust gas to the intake manifold 16 as desired. In embodiments that include the turbocharger 140, the EGR system 150 may be positioned downstream of the turbine 142 and upstream of the aftertreatment unit 130. Under low load and/or cold ambient operating conditions, the EGR valve 152 may be closed to prevent recirculation of any portion of the available, relatively hot exhaust gas, thereby directing all of it through the aftertreatment unit 130.

In at least one embodiment, the engine system 101 may include insulation 146 to prevent heat loss from the relatively hot exhaust gas to the environment. As shown in FIG. 2, the insulation 146 may at least partially envelop the aftertreatment unit 130. Moreover, the insulation 146 may extend to envelop at least a portion of the exhaust line 138. In embodiments including the turbocharger 140, the insulation 146 may extend from the turbine 144 and around the aftertreatment unit 130. The insulation 146 may further envelop the entire exhaust gas path from the first and second exhaust manifolds 122a, 122b to an outlet 137 of the aftertreatment unit 130. In certain embodiments, the insulation 146 may further envelop the recirculation line 139. The insulation 146 may be any suitable material capable of withstanding the temperatures of the exhaust system 120 and the environmental and service conditions of a given application in which the engine system 101 is employed. The insulation 146 reduces the temperature drop between the first and second exhaust manifolds 122a, 122b and the outlet 137 of the aftertreatment unit 130, thereby substantially maintaining the temperature of the exhaust gas through the exhaust system 120 to further elevate the temperature of the aftertreatment unit 130. The insulation 146 may be particularly effective where the engine system 101 is employed in large-scale industrial applications and more particularly in cold ambient operating environments, where significant drops in the temperature of the exhaust gas may be observed due to heat transfer from the exhaust line 138 in such applications. Consequently, the insulation 146 assists in maintaining the temperature of the exhaust gas through the exhaust system 120, which may have significant impact on the performance of the aftertreatment unit 130, especially at low loads where the exhaust gas temperature may be least.

The aftertreatment unit 130 may further include a temperature sensor 162 in communication with the flow of exhaust gas through the aftertreatment unit 130. The temperature of the flow of exhaust gas through the aftertreatment system 130 may be monitored as a proxy of the temperature of the aftertreatment system 130. The temperature sensor 162 may be any suitable device, including but not limited to a thermocouple, thermistor, and pyrometer. The temperature sensor 162 may be in communication with the controller 60 to provide feedback on the performance of the aftertreatment unit 130. For example, the temperature sensor 162 may provide information indicating that the aftertreatment unit 130 is below the activation temperature, thereby triggering the controller 60 to initiate the regeneration mode of operation to raise the temperature of the aftertreatment unit 130. Moreover, temperature sensor 162 may provide information indicating that the aftertreatment unit 130 is above the activation temperature, thereby triggering the controller 60 to switch from the regeneration mode to another mode of operation, such as the standard mode. In certain embodiments, the temperature sensor 162 may include several such sensors, each in communication with the controller 60 and one of aftertreatment components, namely the DOC 136, the DPF 134, and/or the SCR 132. In such an embodiment, the controller 60 may initiate the regeneration mode according to the activation temperature of each given aftertreatment components. In certain other embodiments, the temperature sensor 162 may include several such sensors positioned both upstream and downstream of the aftertreatment unit 130 and/or one or more aftertreatment components such that a temperature change across each may be determined by the controller 60. Because generally the treatment of certain, specific regulated emissions may be exothermic, a measured temperature rise across a given aftertreatment component may indicate that the aftertreatment unit 130 is operating effectively.

The schematic flow descriptions that follow provide illustrative embodiments of methods to improve the performance of an aftertreatment system for an internal combustion engine by elevating the temperature of the aftertreatment system. Operations illustrated are understood to be exemplary only, and the operations may be combined or divided, and added or removed, as well as re-ordered in whole or part, unless stated explicitly to the contrary herein. Certain operations illustrated may be implemented by a computer executing a computer program product on a non-transient computer readable storage medium, where the computer program product comprises instructions causing the computer to execute one or more of the operations, or to issue commands to other devices to execute one or more of the operations.

Certain operations described herein include operations to interpret one or more parameters. Interpreting, as utilized herein, includes receiving values by any method known in the art, including at least receiving values from a datalink or network communication, receiving an electronic signal (e.g., a voltage, frequency, current, or PWM signal) indicative of the value, receiving a software parameter indicative of the value, reading the value from a memory location on a non-transient computer readable storage medium, receiving the value as a run-time parameter by any means known in the art, and/or by receiving a value by which the interpreted parameter can be calculated, and/or by referencing a default value that is interpreted to be the parameter value.

Figure 3:
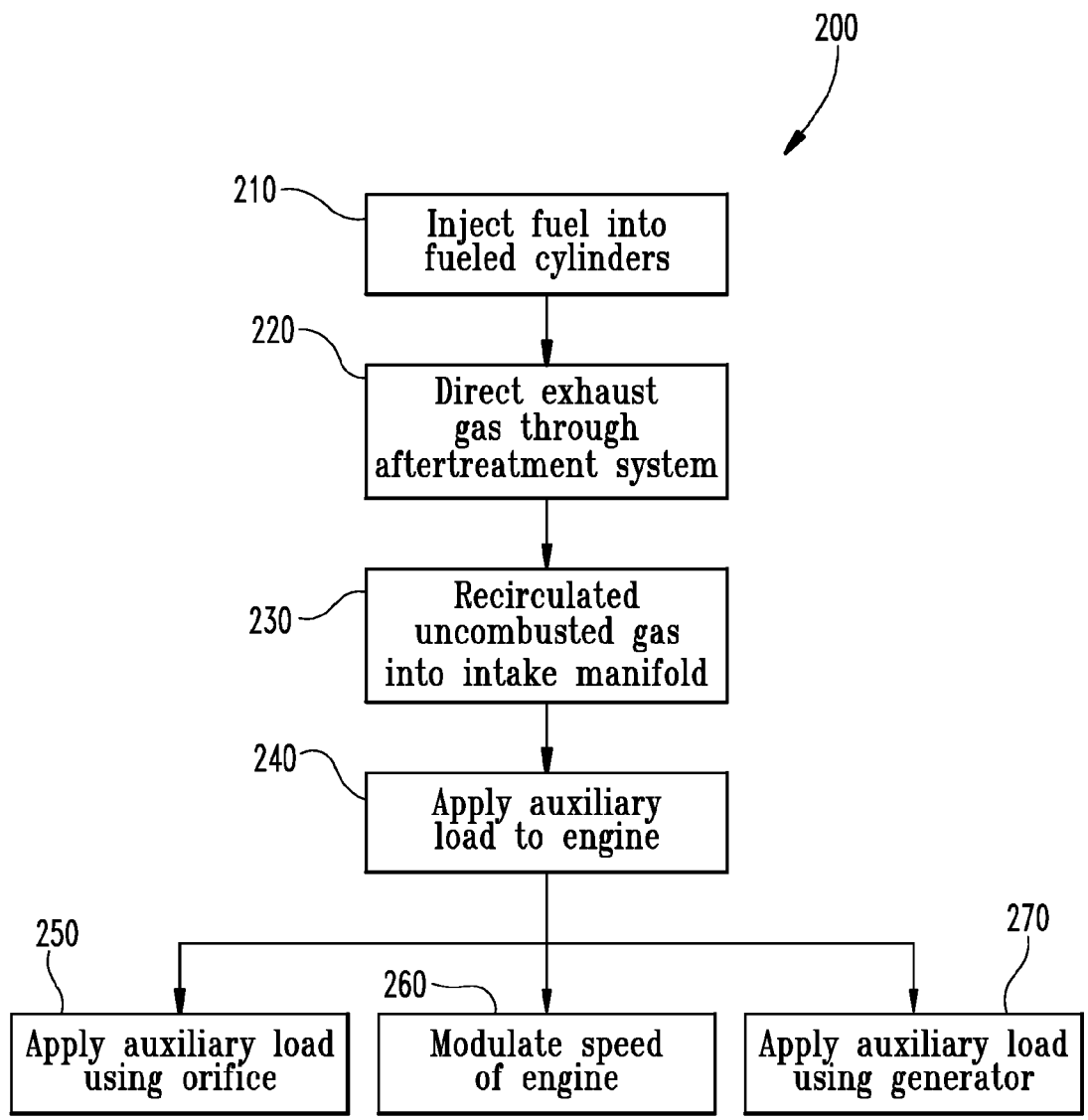
FIG. 3 is a schematic flow diagram of a method for improving the performance of an aftertreatment system of an engine system according to the present disclosure.

As shown in FIG. 3, a method 200 of improving the performance of the aftertreatment system 30 of the engine system 100 by elevating the temperature of the aftertreatment system 30 for the engine 10 includes an operation 210 of injecting a quantity of the fuel into the first group 12a of cylinders 12 of the engine 10 while not injecting fuel into the second group 12b of cylinders 12, such that the first group 12a includes the fueled cylinders and the second group 12b includes the non-fueled cylinders. In the operation 210, the quantity of fuel includes all of the demanded fuel required to meet the current demand for torque and/or power from the engine 10. The method may include an operation 220 of directing the exhaust gas generated by combustion of the quantity of fuel in the fueled cylinders through the aftertreatment system 30, thereby increasing the temperature of the aftertreatment system 30. In embodiments including more than one aftertreatment unit, such as the first aftertreatment unit 30a and the second aftertreatment unit 30b, the operation 220 may include directing all of the exhaust gas in the fueled cylinders through on aftertreatment unit, either the first aftertreatment unit 30a or the second aftertreatment unit 30b.

The method 200 may further include an operation of directing non-fueled, uncombusted gas discharged by the non-fueled cylinders away from the aftertreatment system 30. In certain embodiments, the method 200 may include an operation 230 of recirculating the non-fueled, uncombusted gas into the intake manifold 16 of the engine 10 via the recirculating line 39. As described herein, continued recirculation of the non-fueled gas may raise the temperature of the exhaust gas due to mixing in the intake manifold 16.

The method 200 may include an operation 240 of applying an auxiliary load to the engine 10 to increase the quantity of demanded fuel burned in the fueled cylinders (e.g., the first group 12a), which increases the temperature of the exhaust gas generated in the fueled cylinders, thereby elevating the temperature of the aftertreatment system 30. In embodiments of the engine system 100 including the orifice 28, the method 200 may include an operation 250 of applying the auxiliary load of operation 240 by directing the non-fueled, uncombusted gas being recirculated through the recirculating line 39 through the orifice 28 to restrict the flow of non-fueled, uncombusted gas, thereby increasing the pumping work of the non-fueled cylinders, which increases the demanded fuel and, consequently, the temperature of the exhaust gas generated in the fueled cylinders, thereby elevating the temperature of the aftertreatment system 30. In certain embodiments, the operation 250 may include adjusting the orifice 28 to modulate the pumping work of the engine 10.

Alternatively and/or additionally, the method 200 may include an operation 260 of applying the auxiliary load of operation 240 by modulating the speed of the engine 10 when at an idle operating condition. Typically, an engine may idle at about a nominal level of 600 revolutions per minute ("RPM"). The operation 260 may include increasing the speed of the engine 10 up to approximately an operating range of the turbocharger 140, which may typically be about 1000 RPM. When the aftertreatment system 30 approaches a desired temperature, the engine speed may be reduced to the nominal level. By modulating the engine speed, the operation 260 enables adjustments of the aftertreatment system temperature with only incremental increases in fuel consumption.

In embodiments of the engine system 100 including the generator 18, the method 200 may include an operation 270 of applying the auxiliary load of operation 240 using the generator 18 connected to the engine 10 to increase the load on the engine 10 and dumping surplus generated power, for instance, to the environment as waste heat. In an embodiment, the surplus generated power is directed to a heating grid disposed inside the exhaust pipe. In certain embodiments, the method may include applying the auxiliary load of operation 240 using a hydraulic pump mechanically coupled to the engine 10 where the electric power generated by the auxiliary load is directed to a heating grid disposed inside the exhaust pipe.

In at least one embodiment of the method 200, at least a portion of the aftertreatment system 30 may be enveloped in the insulation 46. Though the foregoing description of the method 200 is presented with respect to the engine system, certain embodiments of the method 200 may be performed using the engine system 101 as well.

Figure 4:
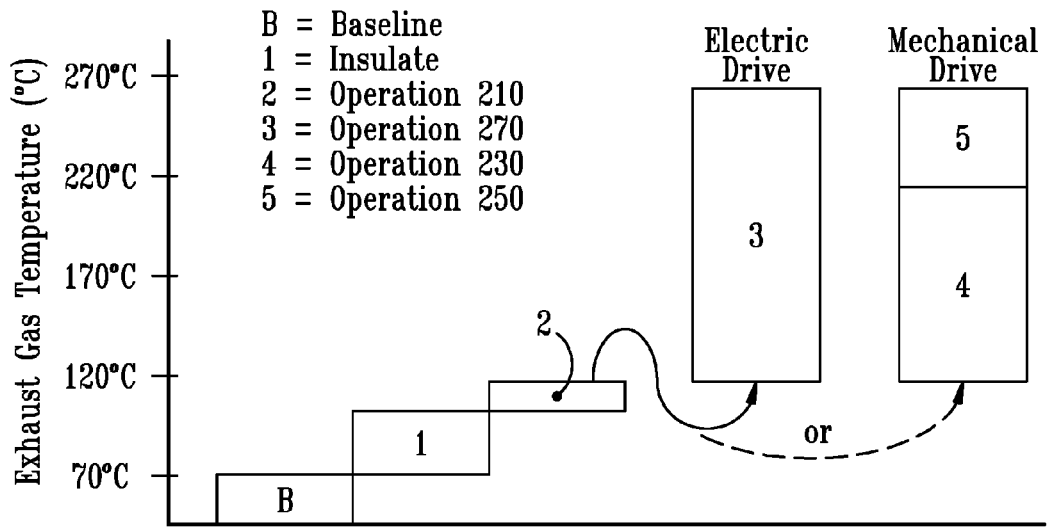
FIG. 4 is a chart of exemplary effects on exhaust gas temperature in degrees Celsius (° C.) for operations of a method for improving the performance of an aftertreatment system of an engine system according to the present disclosure.

FIG. 4 illustrates the relative impact of the operations of the method 200 on exhaust gas temperature for the exemplary embodiment of the engine system 100 operating at a low speed, low load condition such as idle. As shown in FIG. 4, operating at a low load, low speed condition, an exemplary engine system may achieve an exhaust gas temperature of only about 70° C. (labeled "Baseline"). In comparison, an embodiment of the engine system 100 that includes the insulation 46 enveloping at least a portion of the aftertreatment system 30 may achieve an exhaust gas temperature around 50° C. greater under the same operating conditions. Moreover, an embodiment of the engine system 100 using the operation 210 of the method 200 that includes the operation of injecting all of the demanded fuel into one half of the cylinders 12, while not injecting any of the fuel into the other half of the cylinders 12, may further increase the temperature of the exhaust gas about 20° C. As further shown in FIG. 4, the operation 240 of applying an auxiliary load to the engine system 100 may elevate the exhaust gas temperature to approximately 270° C. For instance, an embodiment of the engine system 100 using the operation 270 that includes applying the auxiliary load via the generator 18 may increase the exhaust gas temperature by approximately 150° C. Alternatively, an embodiment of the engine system 100 using the operation 230 in which the non-fueled, uncombusted gas is recirculated into the intake manifold 16 of the engine 10 via the recirculating line 39 may increase the exhaust gas temperature by approximately 100° C. In another embodiment, an auxiliary load may be applied via the hydraulic pump and may increase the exhaust gas temperature.

Moreover, an embodiment of the engine system 100 using the operation 250 in which the flow of recirculated, non-fueled gas is restricted via the orifice 28 may increase the exhaust gas temperature by about 50° C.

Figure 5:
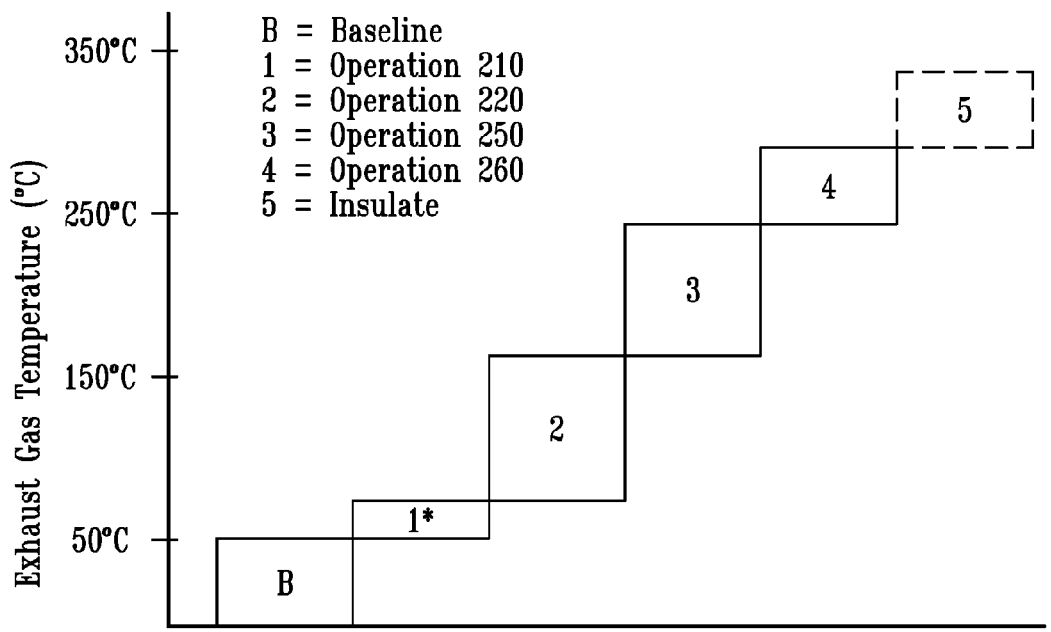
FIG. 5 is a chart of exemplary effects on exhaust gas temperature in degrees Celsius (° C.) for operations of an alternative method for improving the performance of an aftertreatment system of an engine system according to the present disclosure.

FIG. 5 illustrates the relative impact of an alternative application of the operations of the method 200 on exhaust gas temperature for an alternative embodiment of the engine system 100 operating at a low speed, low load condition such as idle. As shown in FIG. 5, operating at a low load, low speed condition, an exemplary engine system may achieve an exhaust gas temperature just above 50° C. (labeled "Baseline"). In comparison, an embodiment of the engine system 100 that includes the insulation 46 and employs the operation 210, the operation 230, the operation 250, and the operation 260 of the method 200 may increase exhaust gas temperature to approximately 350° C.

As FIGS. 4 and 5 illustrate, the operations of the method 200 may be employed in various combinations, depending on the operating conditions and embodiment of the engine system 100, to raise the exhaust gas temperature to at least the activation temperature and improve the performance of the aftertreatment system 30. For example, in certain applications of the engine system 100, insulating the aftertreatment system 30 with the insulation 46 may not be practicable or economical. In such an application, the operation 210 and operation 230 may be adequate to raise the exhaust gas temperature to at least the activation temperature. In another example, though depicted separately in FIG. 4, an exemplary embodiment of the engine system 100 including the generator 18, the recirculation line 39, and the orifice 28 may employ the operation 270 using the generator 18 under certain operating conditions but may further employ the operation 230 and operation 260 using the recirculation line 39 and orifice 28 additionally or alternatively depending on the operating conditions. In yet another example, under certain operating conditions, the operation 210 may be adequate to elevate the aftertreatment system 30 above its activation temperature to improve the performance of the aftertreatment system 30.

Computer simulations modeling the engine system 100, using finite element and computational fluid dynamics methods, have demonstrated synergistic effects of the combining the operations of the method 200 to improve aftertreatment system performance by raising aftertreatment component temperatures and mitigating fouling. In certain embodiments, the computer simulations indicate that combining the operations of the method 200 produced unexpectedly larger increases in the temperature of the aftertreatment components, specifically a SCR, that exceed the expected temperature increase from each of the operations employed separately. Consequently, various combinations of the operations of the method 200 yield unexpected synergistic effects that further raise aftertreatment component temperatures.

Figure 6:
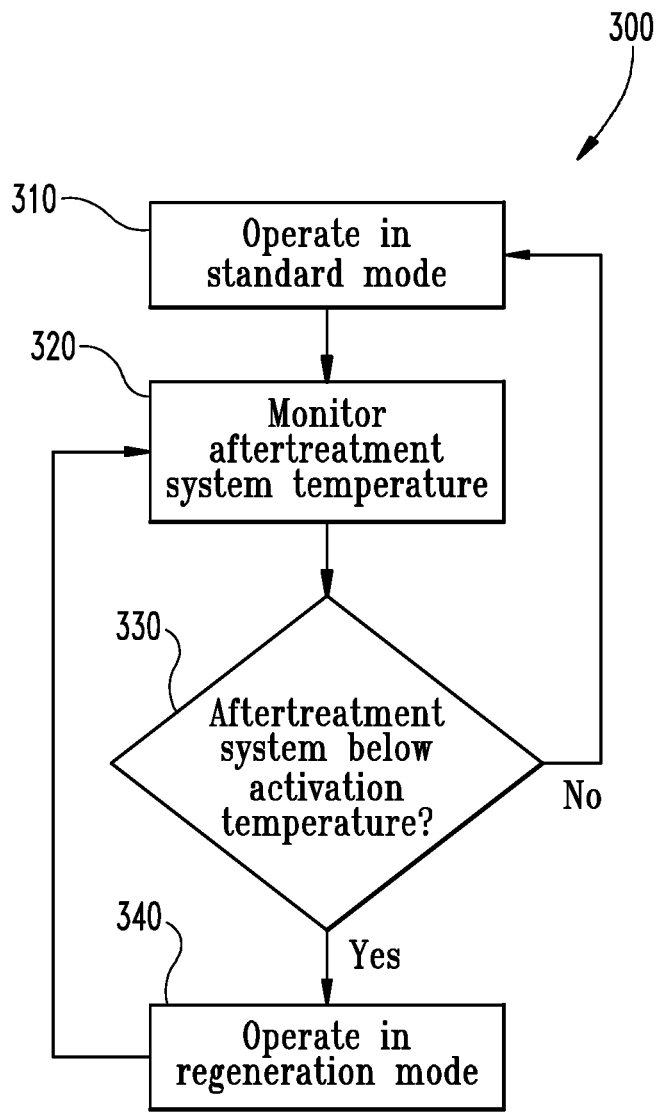
FIG. 6 is a schematic flow diagram of another method for improving the performance of an aftertreatment system of an engine system according to the present disclosure.
Figure 7:
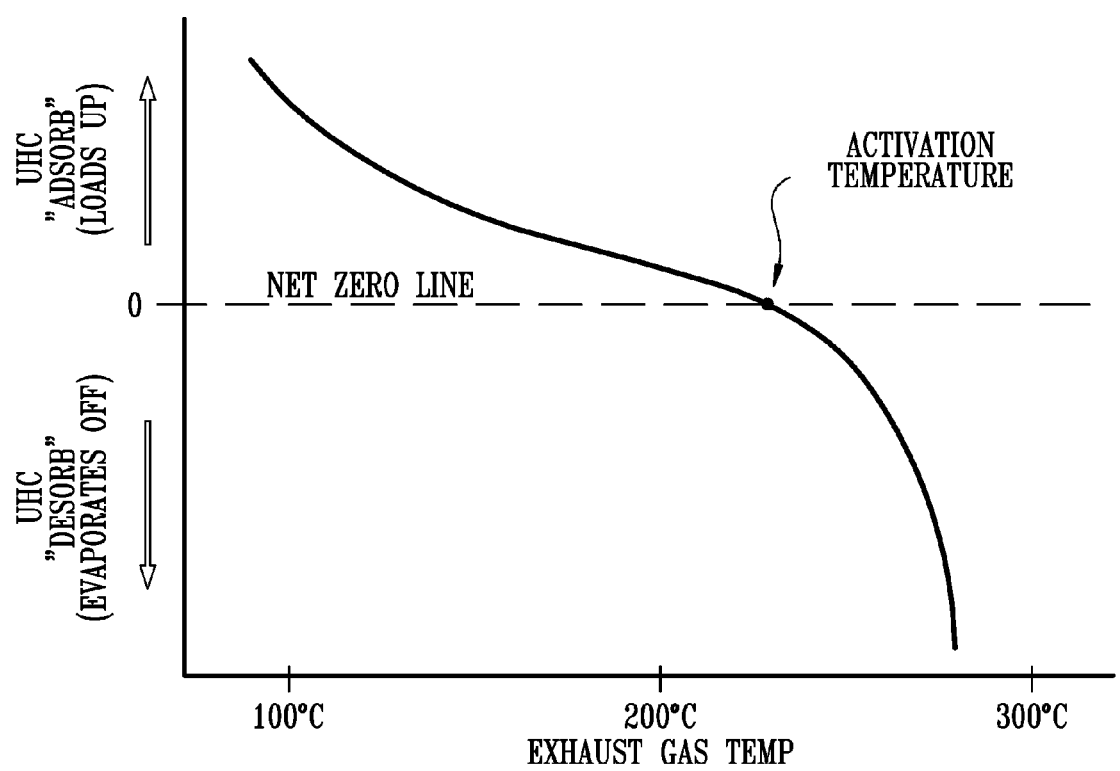
FIG. 7 is a plot of the relative concentration of unburned hydrocarbons absorbed or desorbed over an exhaust gas temperature range in degrees Celsius (° C.) for a conventional aftertreatment system.

In at least one embodiment according to the present disclosure, a method 300 of improving the performance of the aftertreatment system 30 of the engine system 100 by elevating the temperature of the aftertreatment system 30 of the engine 10 is shown in FIG. 6. The method 300 includes an operation 310 of operating the engine 10 in a standard mode of operation. The standard mode of operation may include supplying fuel to all cylinders 12 of the engine 10 via the injectors 14 substantially evenly to meet the demanded power and/or torque and discharging exhaust gas generated in all cylinders 12 through the aftertreatment system 30. In embodiments including more than one aftertreatment unit, for example the first aftertreatment unit 30a and the second aftertreatment unit 30b, the standard mode may include directing or routing at least a portion of the exhaust gas through all aftertreatment units, including both the first aftertreatment unit 30a and the second aftertreatment unit 30b. The standard mode may further include other engine parameter settings appropriate for the operating conditions of the engine 10 and the demanded power and/or torque as commanded by the controller 60.

The method 300 may further include an operation 320 of monitoring the temperature of the aftertreatment system 30, for example, using the first temperature sensor 62 and/or the second temperature sensor 64. Alternatively and/or additionally, the temperature of the flow of exhaust gas through the aftertreatment system 30 may be monitored as a proxy of the temperature of the aftertreatment system 30. In such an embodiment, the temperature of the exhaust gas may be monitored at an inlet of the aftertreatment system 30. In certain embodiments of the operation 320, monitoring of the first and/or second temperature sensor 62, 64 may be performed by the controller 60 in communication with the temperature sensors 62, 64 and the engine 10. The method 300 may include an operation 330 of operating on the monitored temperature to determine whether to change operation of the engine 10 from the standard mode. In the operation 330, if the first temperature sensor 62 and/or the second temperature sensor 64 indicate that the temperature of the aftertreatment system 30 is above its activation temperature, the controller 60 may continue to command the engine 10 to operate in the standard mode and continue to monitor the temperature of the aftertreatment system 30. However, if the first temperature sensor 62 and/or the second temperature sensor 64 indicate that the temperature of the aftertreatment system 30 is below its activation temperature, the method 300 may include an operation 340 of operating the engine 10 in the regeneration mode. In the operation 340, the controller 60 may operate upon the temperature of the aftertreatment system 30 and command the engine 10 to switch from the standard mode to operate in the regeneration mode. Upon switching from the standard to regeneration mode of operation, the method 300 may return to the operation 320 of monitoring the temperature of the aftertreatment system 30 and proceed accordingly.

In certain embodiments of the method 300, the regeneration mode may include one or more of the operations of the method 200 as described herein. Accordingly, the method 300 may include the operation 210 of injecting a quantity of the fuel into only a portion of the cylinders 12 of the engine 10 (i.e., the fueled cylinders) while not injecting fuel into the remaining portion of cylinders 12 (i.e., the non-fueled cylinders), where the quantity of fuel includes all of the demanded fuel required to meet the current demand for torque and/or power from the engine 10. The method 300 may include the operation 220 of directing the exhaust gas generated in the fueled cylinders through the aftertreatment system 30, thereby increasing the temperature of the aftertreatment system 30. The method 300 may further include the operation 230 of directing the uncombusted, non-fueled gas discharged from the non-fueled cylinders away from the aftertreatment system 30, such as recirculating the non-fueled gas into the intake manifold 16 of the engine 10 via the recirculating line 39, as in the operation 240. Moreover, the method 300 may include the operation 250 of applying an auxiliary load to the engine 10 to increase the quantity of demanded fuel burned in the fueled cylinders, thereby elevating the temperature of the aftertreatment system 30. Consequently, the method 300 may include, in certain embodiments, the operation 260 of applying the auxiliary load using the generator 18, or the hydraulic pump or, in certain embodiments, the operation 270 of applying the auxiliary load by adjusting the orifice 28 to restrict the flow of non-fueled gas through the recirculating line 39. In at least one embodiment of the method 300, at least a portion of the aftertreatment system 30 may be enveloped in the insulation 46.

Though the foregoing description of the method 300 is presented with respect to the engine system, certain embodiments of the method 300 may be performed using the engine system 101 as well.

In certain embodiments, the aftertreatment system may include an SCR catalyst. Aftertreatment components, such as an SCR catalyst, may have an upper threshold operating temperatures. When exhaust gases exceed this upper threshold temperature, the aftertreatment component may not be able to effectively process UHC's. It is therefore desirable to maintain the temperature of the exhaust gas below the upper threshold temperature of the aftertreatment component.

In an embodiment, the engine system 100 may include a derate mode. For example, the engine system 100 may be placed in the derate mode if the temperature of the exhaust gases exceeds the upper threshold temperature of the SCR catalyst. In an embodiment, in the derate mode, the engine system 100 may supply fuel to a fewer number of cylinders 12 than when the engine system 100 is operating in a non-derate mode thereby reducing the temperature of the exhaust gas being directed to the aftertreatment system. Such cylinders 12 may be referred to as active or fueled cylinders. The remaining cylinders 12 are deactivated. The deactivated cylinders 12 may also be referred to as non-fueled cylinders. The deactivated cylinders 12 are supplied with relatively less fuel or with no fuel. In some embodiments, the total amount of fuel supplied to the fueled cylinders in derate mode is less than the total quantity of fuel supplied to the fueled cylinders in the non-derate mode. In certain embodiments, the flow of charge air to the deactivated cylinders 12 is reduced or terminated.

Supplying a relatively fewer number of cylinders 12 with fuel in the derate mode than in the non-derate mode may result in a reduction in the torque and/or power generated by the engine system 100. In certain embodiments, the selective deactivation of cylinders 12 when the engine system 100 is placed in derate mode may result in a torque derate of up to 70%. In addition, the implementation of the derate mode may result in improved fuel economy.

In certain embodiments, the engine system 100 may be placed in derate mode if a key engine system temperature or pressure associated with engine coolant or engine oil, exceeds a threshold level for that input. For example if the temperature of the engine coolant exceeds an upper threshold temperature of an engine coolant, the engine system may be placed in derate mode. In some embodiments, the engine system 100 may be placed in derate mode if the temperature of the engine oil exceeds an upper threshold temperature of an engine oil. While a number of different fault conditions have been described, the engine system 100 may be placed in derate mode in response to the detection of other fault conditions associated with the engine system 100.

In an embodiment, the engine system 100 may be transitioned from the regeneration mode to the derate mode if the temperature of the aftertreatment system is relatively higher than an upper threshold temperature associated with aftertreatment operation. When the engine system 100 is transitioned to derate mode, a reduced quantity of fuel is injected into the fueled cylinders 12. In an embodiment, the reduced quality of fuel is relatively less than the demanded quality of fuel that is injected into the fueled cylinders in regeneration mode.

As is evident from the figures and text presented above, a variety of embodiments according to the present disclosure are contemplated. Such system embodiments may be employed in a variety of methods, processes, procedures, steps, and operations as a means of improving the performance of an aftertreatment system for an internal combustion engine.

According to one aspect, a method of adjusting the temperature of an aftertreatment system of an internal combustion engine is disclosed. The method includes placing an internal combustion engine in a standard mode when a temperature of an aftertreatment system is substantially equal to or greater than an activation temperature and in a regeneration mode when the temperature of the aftertreatment system is less than the activation temperature, when in regeneration mode, injecting a demanded quantity of a fuel to be combusted into fueled cylinders of a plurality of combustion cylinders of the internal combustion engine when the internal combustion engine is operating in regeneration mode, the plurality of combustion cylinders further comprising non-fueled cylinders, where combustion of the fuel generates relatively hotter exhaust gas that is discharged from the fueled cylinders, and where the non-fueled cylinders discharge relatively colder uncombusted gas, and when in regeneration mode, directing the exhaust gas generated by the fueled cylinders through the aftertreatment system in fluid communication with the internal combustion engine, where the demanded quantity of fuel injected into the fueled cylinders is substantially equal to a quantity of fuel injected into the plurality of combustion cylinders when the internal combustion engine is operating in standard mode.

In one embodiment, the aftertreatment system consists of a single aftertreatment unit, and the method includes directing the uncombusted gas from the non-fueled cylinders away from the aftertreatment system. In another embodiment, directing the exhaust gas through the aftertreatment system in fluid communication with the internal combustion engine comprises directing the exhaust gas through a first one of at least two aftertreatement units of the aftertreatment system in fluid communication with the internal combustion engine. In a refinement of this embodiment, the method includes directing the uncombusted gas from the non-fueled cylinders through a second one of the at least two aftertreatment units of the aftertreatment system in fluid communication with the internal combustion engine. In another refinement, the method includes directing the uncombusted gas from the non-fueled cylinders away from the first one of the at least two aftertreatment units.

In another embodiment, the method includes discharging the uncombusted gas from the non-fueled cylinders into an environment external to the internal combustion engine. In yet another embodiment, the method includes supplying an amount of charge air to each of the fueled cylinders when the internal combustion engine is operating in the regeneration mode that is substantially equal to the amount of charge air supplied to each of the plurality of combustion cylinders when the internal combusting engine is operating in standard mode. In another embodiment, the method includes recirculating the uncombusted gas into an intake manifold in fluid communication with the internal combustion engine. In a refinement of this embodiment, the method further includes recirculating the uncombusted gas through an orifice structured to generate resistance to the recirculating uncombusted gas from the non-fueled cylinders. In a further refinement, the orifice is adjustable.

In another embodiment, the method includes applying an auxiliary torque load to the engine supported by an increase in the amount demanded fuel injected into the fueled cylinders. In a refinement of this embodiment, the auxiliary load is one of an electromagnetic generator and a hydraulic pump mechanically coupled to the internal combustion engine. In a further refinement, the electrical power generated by the auxiliary load is directed to a heating grid positioned inside the exhaust pipe.

In another embodiment, the method includes modulating the speed of the engine supported by an increase in the amount demanded fuel injected into the fueled cylinders. In another embodiment, the internal combustion engine includes a controller configured to change the mode of the internal combustion engine to one of the standard mode and the regeneration mode in response to a monitored temperature of the aftertreatment system. In yet another embodiment, the method includes placing the internal combustion engine in a derate mode if the temperature of the aftertreatment system is relatively higher than an upper temperature threshold associated with aftertreatment operation; and when in derate mode, injecting a quantity of a fuel that is relatively less than the demanded quantity of fuel injected into fueled cylinders of a plurality of combustion cylinders in regeneration mode. In still another embodiment, the aftertreatment system is at least partially enveloped in thermal insulation According to another aspect, an engine system includes an internal combustion engine having a plurality of combustion cylinders in fluid communication with an intake manifold structured to supply the cylinders with charge gas, each cylinder including a fuel injector capable of selectively supplying each cylinder with a fuel. The system also includes two or more exhaust manifolds, each in fluid communication with at least a portion of the cylinders and structured to enable exhaust gas generated in the cylinders to exit the engine, a first aftertreatment unit in fluid communication with at least one exhaust manifold, an exhaust line connecting the exhaust manifolds to the first aftertreatment unit, and a first exhaust flow valve disposed in the exhaust line between the exhaust manifolds and the first aftertreatment unit. The first exhaust flow valve is structured to selectively direct the exhaust gas from at least one of the exhaust manifolds away from the first aftertreatment unit and to selectively direct the exhaust from at least one other exhaust manifold through the first aftertreatment unit. Fuel is supplied to a portion of the plurality of cylinders, the exhaust gas from which is directed to the first aftertreatment unit, while charge gas from the remaining portion of the plurality of cylinders is directed away from the first aftertreatment unit.

In one embodiment, the system includes a second aftertreatment unit in fluid communication with the exhaust manifolds via the exhaust line and a second exhaust valve disposed in the exhaust line between the exhaust manifolds and the second aftertreatment unit. The second exhaust flow valve is structured to selectively direct the exhaust from at least one of the exhaust manifolds away from the second aftertreatment unit and to selectively direct the exhaust from at least one other exhaust manifold through the second aftertreatment unit. In one embodiment, the first exhaust flow valve is structured to selectively discharge the exhaust gas from at least one of the exhaust manifolds to an environment external to the internal combustion engine.

In another embodiment, the system includes a recirculation line connecting the exhaust manifolds to the intake manifold, and the recirculation line is structured to enable exhaust from the exhaust manifolds to be selectively directed to the intake manifold. In a refinement of this embodiment, the system includes an orifice disposed in the recirculation line, and the orifice structured to restrict the flow of exhaust to the intake manifold. In a further refinement, the orifice is adjustable. In another embodiment, the first aftertreatment unit, the second aftertreatment unit, and the exhaust line are thermally insulated from the environment.

Another aspect includes a method of responding to a fault condition in an internal combustion engine. The method includes detecting a fault condition at an internal combustion engine; placing the internal combustion engine in a derate mode in response to the detected fault condition; injecting a quantity of a fuel to be combusted into a first number of fueled cylinders of a plurality of combustion cylinders of the internal combustion engine in the derate mode, where the first number of fueled cylinders in the derate mode is less than a second number of fueled cylinders in a non-derate mode; where a total quantity of fuel injected into the first number of fueled cylinders when the internal combustion engine is operating in derate mode is less than a total quantity of fuel injected into the second number of fueled cylinders when the internal combustion engine is operating in a non-derate mode.

In one embodiment, the method includes directing exhaust gas generated by the cylinders through an aftertreatment system including at least one aftertreatment component and where detecting a fault condition comprises: detecting a temperature of exhaust gas discharged from the fueled cylinders when the internal engine is operating in a non-derate mode and determining if the detected temperature is greater than an upper threshold temperature of the aftertreatment component. In a refinement of this embodiment, the aftertreatment component comprises a selective catalytic reduction catalyst.

In another embodiment, detecting a fault condition includes detecting a temperature of engine coolant at the internal combustion engine and determining if the detected temperature is greater than an upper threshold temperature of an engine coolant. In yet another embodiment, detecting a fault condition includes detecting a temperature of engine oil at the internal combustion engine and determining if the detected temperature is greater than an upper threshold temperature of an engine oil. In a further embodiment, the method includes terminating the supply of charge air to the non-fueled cylinders when the internal combustion engine is operating in derate mode. In still another embodiment, detecting a fault condition includes detecting a key engine system parameter and determining whether the key engine parameter exceeds a threshold limit for that parameter. In a refinement of this embodiment, detecting a key engine parameter includes detecting one a pressure and temperature associated with a key engine system.

According to another aspect a method includes, by program instructions on a computing device, detecting a fault condition at an internal combustion engine; placing the internal combustion engine in a derate mode in response to the detected fault condition; injecting a quantity of a fuel to be combusted into a number of fueled cylinders of a plurality of combustion cylinders of the internal combustion engine, where the number of fueled cylinders in derate mode is less than the number of fueled cylinders in a non-derate mode; where a total quantity of fuel injected into the fueled cylinders when the internal combustion engine is operating in derate mode is less than a total quantity of fuel injected into the plurality of combustion cylinders when the internal combustion engine is operating in a non-derate mode.

In one embodiment, the method includes directing exhaust gas generated by the cylinders through an aftertreatment system including at least one aftertreatment component and detecting a fault condition includes: detecting a temperature of exhaust gas discharged from the fueled cylinders when the internal engine is operating in a non-derate mode and determining if the detected temperature is greater than an upper threshold temperature of the aftertreatment component. In a refinement of this embodiment, the aftertreatment component comprises a selective catalytic reduction catalyst.

In another embodiment, detecting a fault condition includes detecting a temperature of engine coolant at the internal combustion engine and determining if the detected temperature is greater than an upper threshold temperature of an engine coolant. In another embodiment, detecting a fault condition includes detecting a temperature of engine oil at the internal combustion engine and determining if the detected temperature is greater than an upper threshold temperature of an engine oil. In another embodiment, the method includes terminating the supply of charge air to the non-fueled cylinders when the internal combustion engine is operating in derate mode. In still another embodiment, detecting a fault condition includes detecting a key engine system parameter and determining whether the key engine parameter exceeds a threshold limit for that parameter. In a refinement of this embodiment, the method includes detecting a key engine parameter comprises detecting one of a pressure and a temperature associated with a key engine system.

While the invention has been illustrated and described in detail in the drawings and foregoing description, the same is to be considered as illustrative and not restrictive in character, it being understood that only certain exemplary embodiments have been shown and described. Those skilled in the art will appreciate that many modifications are possible in the example embodiments without materially departing from this invention. Accordingly, all such modifications are intended to be included within the scope of this disclosure as defined in the following claims.

The invention claimed is:

1. An engine system comprising:
an internal combustion engine having a plurality of combustion cylinders in fluid communication with an intake manifold structured to supply the cylinders with charge gas, each cylinder including a fuel injector capable of selectively supplying each cylinder with a fuel;
two or more exhaust manifolds, each in fluid communication with respective first and second portions of the cylinders and structured to enable exhaust gas generated in the cylinders to exit the engine;
a first aftertreatment unit downstream of the two or more exhaust manifolds;
an exhaust line connecting the exhaust manifolds to the first aftertreatment unit;
a recirculation line connecting the exhaust manifolds to the intake manifold;
a first exhaust flow valve disposed in the exhaust line between a first one of the exhaust manifolds and the first aftertreatment unit, the first exhaust flow valve structured to selectively direct the exhaust gas from the first exhaust manifold either through the first aftertreatment unit or away from the first aftertreatment unit into the recirculation line;
a second exhaust flow valve disposed between a second one of the exhaust manifolds and the first aftertreatment unit, the second exhaust flow valve structured to selectively direct the exhaust gas from the second exhaust manifold either through the first aftertreatment unit or away from the first aftertreatment unit into the recirculation line; and
a controller, in response to a regeneration mode of operation for the first aftertreatment unit, configured to fuel only one of the first portion or the second portion of the plurality of cylinders and position the first and second exhaust flow valves so the exhaust gas from combustion of fuel in the one of the first portion or the second portion of the plurality of cylinders is directed to the first aftertreatment unit and non-fueled charge gas from the other of the first portion and the second portion of the plurality of cylinders is directed away from the first aftertreatment unit through the recirculation line to the intake manifold.

2. The system of claim 1, wherein the first exhaust flow valve is structured to selectively discharge the exhaust gas from the first exhaust manifold to an environment external to the internal combustion engine.

3. The system of claim 1, the system further comprising:
an orifice disposed in the recirculation line, the orifice structured to restrict the flow of exhaust to the intake manifold.

4. The system of claim 3, wherein the orifice is adjustable.

5. The system of claim 1, further comprising insulation enveloping the first aftertreatment unit.

6. The system of claim 5, wherein the insulation envelops the recirculation line.

7. The system of claim 1, further comprising a temperature sensor in communication with the exhaust gas in the first aftertreatment unit to provide a temperature of the first aftertreatment unit, wherein the temperature sensor is in communication with the controller and the controller is configured to initiate the regeneration mode of operation in response to the temperature of the first aftertreatment unit being below an activation temperature.

8. The system of claim 1, wherein the controller is configured to apply an auxiliary torque load to the internal combustion engine that is supported by an increase in an amount of demanded fuel injected into the one of the first portion and the second portion of the plurality of cylinders that are fueled.

9. The system of claim 8, wherein the auxiliary torque load is one of an electromagnetic generator and a hydraulic pump mechanically coupled to the internal combustion engine.

10. The system of claim 9, wherein electrical power generated by the electromagnetic generator is directed to a heating grid positioned inside the exhaust line.

11. An engine system comprising:
an internal combustion engine having a plurality of combustion cylinders in fluid communication with an intake manifold structured to supply the cylinders with charge gas, each cylinder including a fuel injector capable of selectively supplying each cylinder with a fuel;
two or more exhaust manifolds, each in fluid communication with respective first and second portions of the cylinders and structured to enable exhaust gas generated in the cylinders to exit the engine;
a first aftertreatment unit downstream of the two or more exhaust manifolds;
an exhaust line connecting the exhaust manifolds to the first aftertreatment unit;
a recirculation line connecting the exhaust manifolds to the intake manifold;
a first exhaust flow valve disposed in the exhaust line between a first one of the exhaust manifolds and the first aftertreatment unit, the first exhaust flow valve structured to selectively direct the exhaust gas from the first exhaust manifold either through the first aftertreatment unit or away from the first aftertreatment unit into the recirculation line;
a second exhaust flow valve disposed between a second one of the exhaust manifolds and the first aftertreatment unit, the second exhaust flow valve structured to selectively direct the exhaust gas from the second exhaust manifold either through the first aftertreatment unit or away from the first aftertreatment unit into the recirculation line;
a controller configured to fuel only one of the first portion or the second portion of the plurality of cylinders and position the first and second exhaust flow valves so the exhaust gas from combustion of fuel in the one of the first portion or the second portion of the plurality of cylinders is directed to the first aftertreatment unit and non-fueled charge gas from the other of the first portion and the second portion of the plurality of cylinders is directed away from the first aftertreatment unit through the recirculation line to the intake manifold; and
a temperature sensor in communication with the exhaust gas in the first aftertreatment unit to provide a temperature of the first aftertreatment unit, wherein the temperature sensor is in communication with the controller and the controller is configured to initiate a regeneration mode of operation in response to the temperature of the first aftertreatment unit being below an activation temperature, and
wherein the controller is configured to fuel only one of the first portion or the second portion of the plurality of cylinders and position the first and second exhaust flow valves so the exhaust gas from combustion of fuel in the one of the first portion or the second portion of the plurality of cylinders is directed to the first aftertreatment unit and non-fueled charge gas from the other of the first portion and the second portion of the plurality of cylinders is directed away from the first aftertreatment unit through the recirculation line to the intake manifold in response to initiation of the regeneration mode.

* * * * *